US008547202B2

(12) United States Patent
Huang

(10) Patent No.: US 8,547,202 B2
(45) Date of Patent: Oct. 1, 2013

(54) RFID TAG AND OPERATING METHOD THEREOF

(75) Inventor: Chih-Hua Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 845 days.

(21) Appl. No.: 12/486,079

(22) Filed: Jun. 17, 2009

(65) Prior Publication Data

US 2009/0315673 A1 Dec. 24, 2009

(30) Foreign Application Priority Data

Jun. 18, 2008 (TW) .............................. 97122698 A

(51) Int. Cl.
| | |
|---|---|
| G05B 19/00 | (2006.01) |
| H04Q 5/22 | (2006.01) |
| G08B 13/14 | (2006.01) |
| H04L 9/32 | (2006.01) |
| H04L 29/06 | (2006.01) |
| G06K 5/00 | (2006.01) |
| G06K 19/06 | (2006.01) |
| H04M 1/66 | (2006.01) |
| H04K 3/00 | (2006.01) |

(52) U.S. Cl.
USPC ..... 340/5.61; 340/10.42; 340/5.8; 340/572.1; 340/572.3; 713/168; 713/150; 235/380; 235/492; 455/410; 455/1

(58) Field of Classification Search
USPC ............... 340/571.1, 573.1, 568.1, 500, 505, 340/10.1, 10.3, 825.65, 5.2, 5.31, 12.51, 340/10.41, 928, 10.51, 13.24, 5.61, 5.62; 235/375, 380, 492, 385; 455/410, 404.1, 455/404.2, 411, 41.2, 41.3; 713/168, 150
See application file for complete search history.

(56) References Cited

U.S. PATENT DOCUMENTS

| | | | |
|---|---|---|---|
| 2003/0093663 A1* | 5/2003 | Walker | 713/150 |
| 2004/0054900 A1* | 3/2004 | He | 713/168 |
| 2005/0050436 A1* | 3/2005 | Liang | 714/801 |
| 2005/0218215 A1* | 10/2005 | Lauden | 235/380 |
| 2006/0077034 A1* | 4/2006 | Hillier | 340/5.61 |
| 2006/0145855 A1* | 7/2006 | Diorio et al. | 340/572.1 |
| 2007/0109124 A1* | 5/2007 | Park et al. | 340/572.1 |
| 2008/0299946 A1* | 12/2008 | Jayappa et al. | 455/410 |

* cited by examiner

Primary Examiner — Jennifer Mehmood
Assistant Examiner — Miraza Alam
(74) Attorney, Agent, or Firm — Edell, Shapiro & Finnan, LLC

(57) ABSTRACT

An RFID tag and a method of operating the RFID tag are provided. The RFID tag comprises a memory block that stores at least one predetermined authorization code associated with an RFID reader. In this method, according to the predetermined authorization code and an approval request transmitted from the RFID reader, it is determined by the RFID tag whether the RFID reader is authenticated. When the RFID reader is not authenticated, the RFID tag is controlled to not respond to a subsequent request transmitted from the RFID reader. As a result, the risk that data in the RFID tag may be illegally acquired by an unauthorized RFID reader is reduced.

24 Claims, 11 Drawing Sheets

| ID code | Public key | Authorization code | Authorization level |
|---|---|---|---|
| A001 | B101 | C119 | 5 |
| A002 | B201 | C219 | 2 |
| A003 | B301 | C319 | 1 |
| A004 | B401 | C419 | 3 |

FIG. 2A

| Memory block | Start address | Length (bytes) | Read level | Write level |
|---|---|---|---|---|
| 1 | 00000000 | 512 | >0 | >4 |
| 2 | 00010000 | 512 | >2 | >2 |
| 3 | 00100100 | 1024 | >1 | >3 |
| 4 | 10010000 | 1024 | >0 | >1 |

FIG. 2B

RFID TAG AND OPERATING METHOD THEREOF

CROSS REFERENCE TO RELATED PATENT APPLICATION

This patent application is based on Taiwan, R.O.C. patent application No. 097122698 filed on Jun. 18, 2008.

FIELD OF THE INVENTION

The present invention relates to radio frequency identification (RFID) technology, and more particularly, to an RFID tag and an operating method thereof.

BACKGROUND OF THE INVENTION

Radio frequency identification (RFID) technology is a communication technology that accesses associated data of a specific target using radio frequency (RF) signals. No physical or optical contact is needed between the specific target and a data reading system applying the RFID technology. Therefore, data identification as well as read/write speed of the data reading system is much faster than that of a traditional bar-code device.

Because RFID technology can be widely applied in fields of logistics management, public consumption, identification and smart homes and offices to bring convenience, companies are increasingly investing in research and development regarding RFID technology. However, in addition to not yet having costs low enough to replace bar-code devices in a full-scale, RFID technology is also faced with unsatisfactory data security. More specifically, keeping data confidential over RF signal exchanges stands as a leading goal.

RFID tags are classified into active and passive types according to whether a chip is provided with an internal power supply. Taking a passive RFID tag for example, an antenna of the RFID tag receives an RF signal transmitted from an RFID reader within a specific distance, and provides a chip circuit with power using a received radio wave. Once started, the chip circuit in the RFID tag automatically decodes and interprets the signal received by the antenna, and provides data demanded by the RFID reader in the form of an RF signal, such as an identification number of the tag, or other information pre-stored in an internal memory of the RFID tag.

For the current Electronic Product Code (EPC) ultra-high frequency (UHF) Class1 Gen2 (C1G2) RFID specification, any RFID reader compatible with the EPC UHF C1G2 specification is capable of accessing any RFID tag compatible to the same specification. Further, data provided by an RFIDRF tag is not protected by encryption of any form when transmitted in a transmission medium, e.g., the air, thus making the theft of the data exposed in the air relatively effortless to those with malicious intentions.

SUMMARY OF THE INVENTION

To address the aforesaid issues, among others, the present invention provides a radio frequency identification (RFID) tag and an operating method thereof, that reduce the risk of data in the RFID tag being illegally acquired by an unauthorized RFID reader.

According to one embodiment of the invention, an operating method of an RFID tag is provided. The RFID tag comprises a memory block that stores at least one predetermined authorization code associated with an RFID reader. In the method, the RFID reader is determined whether it is authenticated by the RFID tag according to the predetermined authorization code and an approval request transmitted from the RFID reader. When the RFID reader is authenticated by the RFID tag, the RFID tag is controlled to reply to a subsequent request from the RFID reader.

According to another embodiment of the invention, an RFID tag is provided. The RFID tag comprises a memory block, a receiving module, a determining module and a control module. The memory block stores with at least one predetermined authorization code associated with an RFID reader. The receiving module receives a radio frequency (RF) signal from the RFID reader, and the radio signal comprises an approval request. The determining module determines whether the RFID reader is authenticated according to the approval request and the predetermined authorization code. When the RFID reader is authenticated, the control module can reply to a subsequent request from the RFID reader.

According to further another embodiment of the invention, an operating method of an RFID tag is provided. The RFID tag comprises a memory block that stores with at least one predetermined authorization code. The operating method comprises steps of: the RFID tag receiving an approval request from an RFID reader, determining an authorization level of the RFID reader according to the approval request and the predetermined authorization code, receiving an access request from the RFID reader, and determining whether the RFID reader is permitted to access the memory block according to the authorization level.

According to yet another embodiment of the invention, an RFID tag is provided. The RFID tag comprises a memory block, a receiving module, a determining module and a control module. The memory block stores with at least one predetermined authorization code. The receiving module receives an approval request from an RFID reader. The determining module determines an authorization level of the RFID reader according to the approval request and the predetermined authorization code. The control module determines whether the RFID reader is permitted to access the memory block according to the authorization level when the receiving module receives an access request from the RFID reader.

The RFID reader shall not receive any reply from the RFID tag when it does not pass the foregoing authentication procedure, and is naturally prohibited from acquiring or modifying data stored in the RFID tag. Therefore, the RFID tag and the operating method thereof according to the invention provides better data security compared to the prior art.

Apart from being added into an authentication mechanism, the invention is also applicable to an encryption method for the RFID tag and an associated management procedure.

BRIEF DESCRIPTION OF THE DRAWINGS

The present invention will become more readily apparent to those ordinarily skilled in the art after reviewing the following detailed description and accompanying drawings, in which:

FIG. 2A is an example of an authorization management able pre-stored in the RFID tag; FIG. 2B is an example of a reference table between authorization levels and memory blocks.

DETAILED DESCRIPTION OF THE PREFERRED EMBODIMENT

Figure 1A:
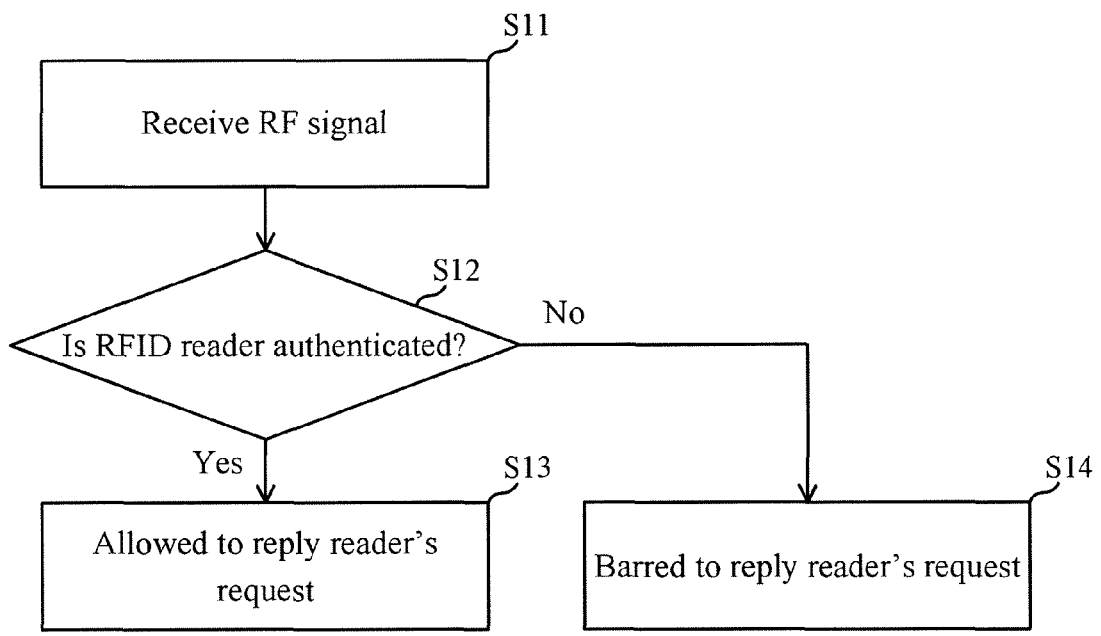
FIG. 1A and FIG. 1B show flowcharts of an operating method of a radio frequency identification (RFID) tag according to the invention.

According to an embodiment of the invention, an operating method of a radio frequency identification (RFID) tag is provided. FIG. 1A shows a flowchart of the operating method. According to the invention, a radio frequency (RF) signal is transmitted by an RFID reader before sending various access requests to the RFID tag, wherein the RF signal comprises an approval request. For example, the approval request may comprise an identification code and/or a set of authorization code of the RFID reader. The RFID tag comprises a memory block that stores at least one predetermined authorization code associated with the RFID reader.

Referring to FIG. 1A, in Step S11, an RFID tag receives the RF signal. In Step S12, it is determined whether the RFID reader is authenticated by the RFID tag according to the approval request and the predetermined authorization code stored in the memory block of the RFID tag. If a result from Step S12 is affirmative, Step S13 is performed to allow the RFID tag to reply to a subsequent request of the RFID reader. On the contrary, if the result from Step S12 is negative, Step S14 is performed to control the RFID tag not to reply to a subsequent request of the RFID reader.

More specifically, the RFID reader shall not obtain any reply from the RFID tag if it does not pass the above authentication procedure, let alone obtain or modify information stored in the RFID tag. A common RFID tag does not actively send signals without receiving a request first, and therefore the RFID tag is regarded as nonexistent for the RFID reader.

Figure 1B:
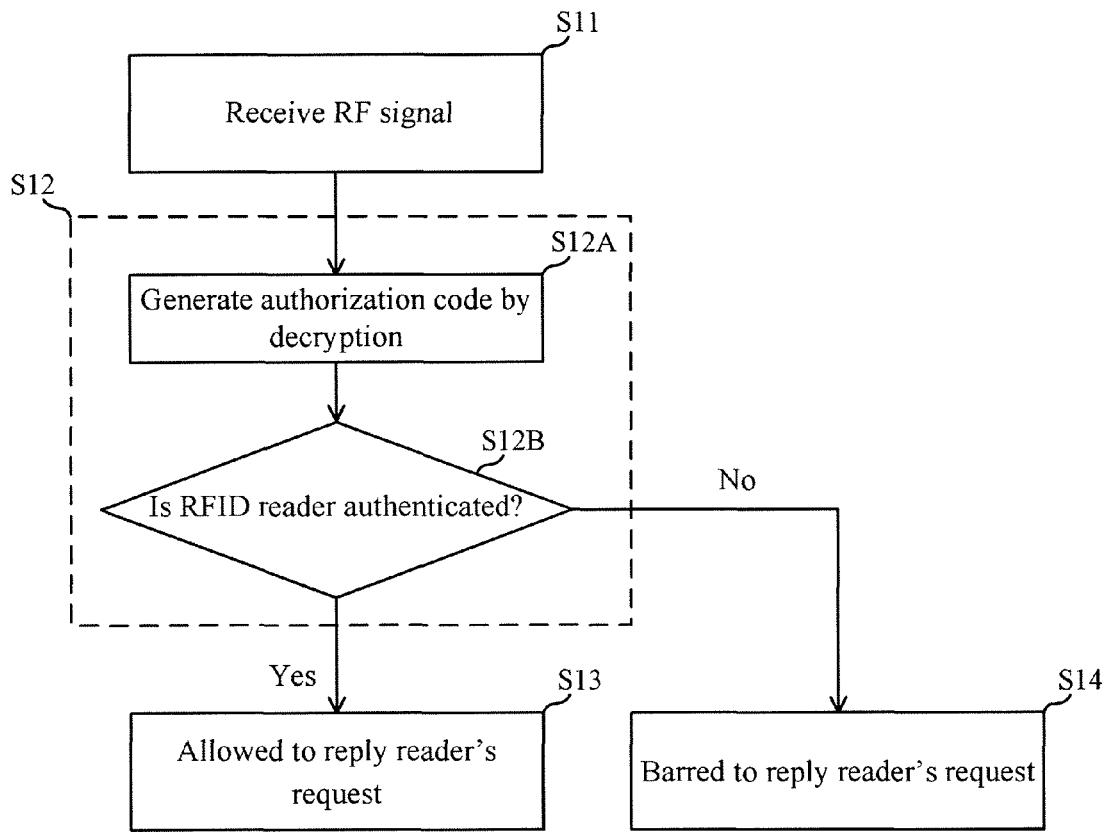

To prevent unlawful acquisition and misuse of the authorization code in the approval request by any illegal devices, the authorization code may be encrypted before the RFID reader sends out the approval request. Referring to FIG. 1B, Step S12 is correspondingly divided into two phases under the condition that the authorization code is encrypted. In Step S12A, the RFID tag first decrypts the encrypted authorization code to generate the authorization code. In Step S12B, it is determined whether the RFID reader is authenticated by the RFID tag according to the decrypted authorization code received from the RFID reader and the predetermined authorization code stored in the memory block of the RFID tag.

In practice, encryption and decryption rules may be the communication protocol first agreed upon between the RFID tag and the RFID reader. For example, supposing the RFID reader adopts a private key from a set of asymmetric keys to encrypt the authorization code, the RFID tag may then correspondingly use a public key from the set of the asymmetric keys to decrypt the encrypted authorization code.

To reinforce flexibility or security level of an RFID system, an identification code of the RFID reader may be included in view of determination on the authentication. More specifically, the RFID tag only permits an RFID reader to read and write the corresponding RFID tags provided that both an identification code and an authorization code of the RFID reader are correct.

FIG. 2A shows an example of an authorization management table stored in advance in the RFID tag. In this example, public keys associated with various RFID readers are different. For instance, supposing the RFID tag receives an approval request from an RFID reader having an identification code of A002, the RFID tag, by looking up the management table, decrypts the authorization code in the approval request using a public key of B201. As shown in the table, a correct decryption result associated with the RFID reader is C219. If the RFID tag finds that the decrypted authorization code is not C219, the RFID reader shall not be authenticated.

Further, the RFID tag may also designate different access authorization levels to various RFID readers. Supposing an approval request from a particular RFID reader is granted, the RFID tag may determine a reply method to a subsequent request according to the authorization level of the RFID reader. As shown in FIG. 2A, the table may include a column for the authorization level; an RFID reader having a higher authorization level is permitted to access more information in the RFID tag. In this example, the RFID reader with an identification code of A001 has a higher access authority than other RFID readers.

For example, the RFID tag may comprise a plurality of memory blocks, of which writing or reading by a particular RFID reader is determined by the authorization level of the RFID reader. Reference is made to FIG. 2B, which shows an example of a reference table between authorization levels and memory blocks. In this example, the memory block No. 3 has a start address and a length of 00100100 and 1024 bytes, respectively; and only an RFID reader with an authorization level of higher than 1 is permitted to read contents of this memory block, and only an RFID reader with an authorization level of higher than 3 is permitted to write contents of this memory block.

Among the RFID readers listed in FIG. 2A, only the RFID reader with an identification code of A001 is permitted to read and write the memory block No. 3, while RFID readers with identification codes of A002, A003 and A004 are permitted to read this memory block only. When making a request for reading and writing information stored in the RFID tag, the RFID reader specifies which memory blocks it wishes to read or write in the request. According to the reference table in FIG. 2B, the RFID tag determines whether to permit the request of the RFID reader.

Figure 3:
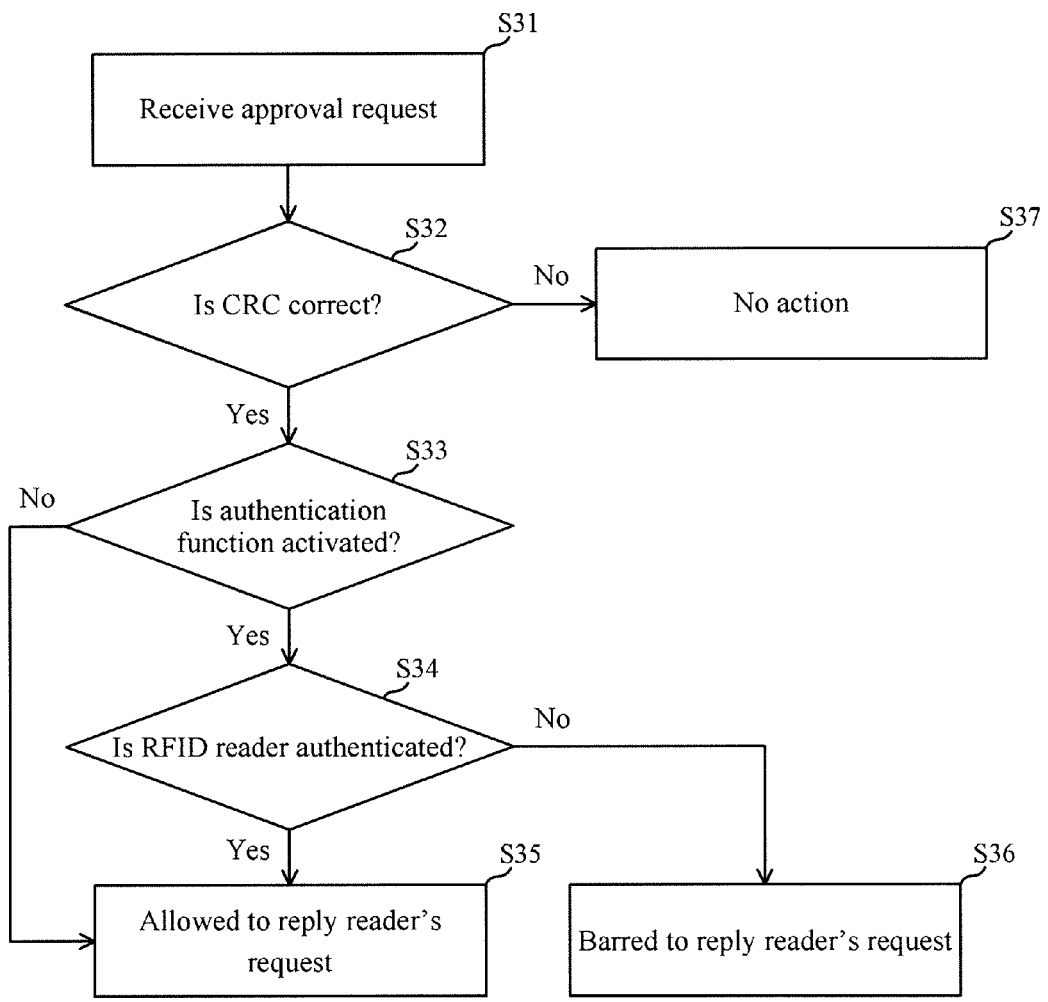
FIG. 3 is a flowchart of an operating method of an RFID tag according to another embodiment of the invention.

It is possible that errors in data occur due to noise interference during wireless transmissions. Thus, the RFID reader may be further added with a check code, e.g., a cyclic redundancy check (CRC) code, in the approval request. FIG. 3 shows a flowchart of another operating method of an RFID tag according to another embodiment of the invention. In this embodiment, after the RFID tag receives an approval request in Step S31, the RFID tag first performs Step S32 to determine whether data in the approval request is correct according to the check code.

If a result from Step S32 is negative, it means that data in the approval request contains errors, and Step S37 is performed to command the RFID tag not to proceed with any other subsequent authentication steps. Only when the result from Step S32 is affirmative, the RFID tag continues with the authentication procedure.

In actual practice, the authentication function of the RFID tag may be designed to have a switch option for facilitating an administrator to turn on or turn off the authentication function. Such condition is taken into consideration in an example shown in FIG. 3. As shown in FIG. 3, before determining whether the RFID reader should be authenticated by the RFID tag in Step S34, the operating method comprises a step of determining whether the authentication function of the RFID tag is activated, as in Step S33.

If a result from Step S33 is negative, Step S34 is skipped to directly perform Step S35; that is, the RFID tag is permitted to reply to a subsequent request transmitted from the RFID reader. On the contrary, if the result from Step S33 is affirmative, Step S34 is performed to determine whether the RFID reader is authenticated by the RFID tag. If the RFID reader is not authenticated by the RFID tag, Step S36 is performed to control the RFID tag not to reply to any subsequent request transmitted from the RFID reader. Alternately, if the RFID reader is successfully authenticated by the RFID tag, Step 35 is performed to permit the RFID tag to reply to a subsequent request transmitted from the RFID reader.

In the example shown in FIG. 3, a chip in the RFID tag may also use a flag to record whether the authentication function of the RFID tag is turned on or turned off. Similarly, the RFID tag may also use the flag to record whether a certain RFID reader has already passed authentication. When a certain RFID reader has successfully passed the authentication procedure, the RFID tag may set an associated flag as authenticated within a predetermined duration, such that the RFID reader need not first send out an approval request before sending out each of all the subsequent requests.

In actual practice, the foregoing subsequent requests may include a selection request for selecting a specific tag group, a singulation request for finding a tag with a specific serial number, and an access request for accessing found tags. According to the invention, only when the RFID reader passes the authentication procedure, the RFID tag replies to these subsequent requests.

Figure 4:
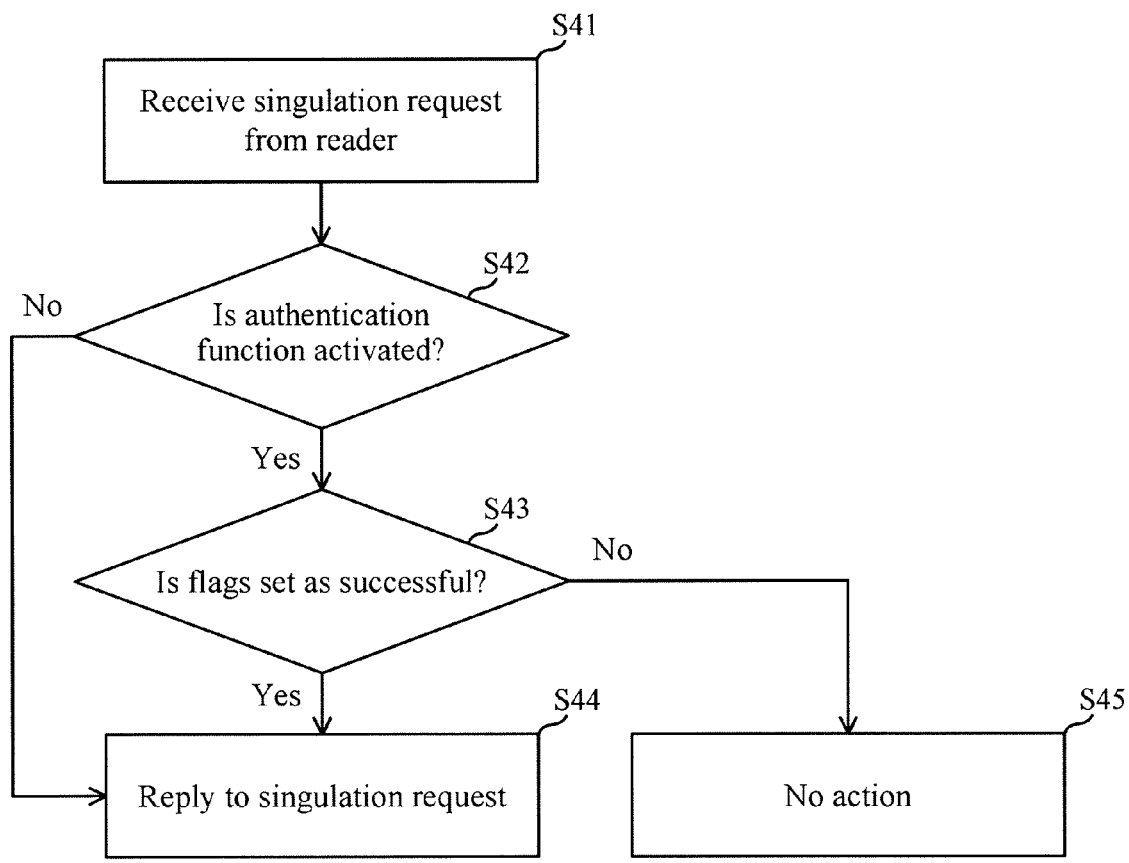
FIG. 4 is a flowchart of an RFID tag replying to a singulation request according to the invention.

FIG. 4 shows a flowchart of an RFID tag replying to a singulation request according to the invention. Generally, an RFID tag does not refuse to receive a request from an RFID reader whether the RFID tag replies to the request. Thus, in Step S41, the RFID tag receives a request from an RFID reader. In Step S42, a flag associated with whether the authentication function is turned on is checked. If a result from Step S42 is negative, the RFID tag directly performs Step S44 to reply to the singulation request.

On the contrary, if the result from Step S42 is affirmative, Step S43 is performed to determine whether a flag associated with the authentication status is set as successful. If the result from Step S43 is affirmative, the RFID tag replies to the singulation request. If the result from Step S43 is negative, the RFID tag does not reply to the singulation request, as in Step S45. Alternately, if affirmative, the RFID tag is permitted to reply to the singulation request in Step 44.

Figure 5A:
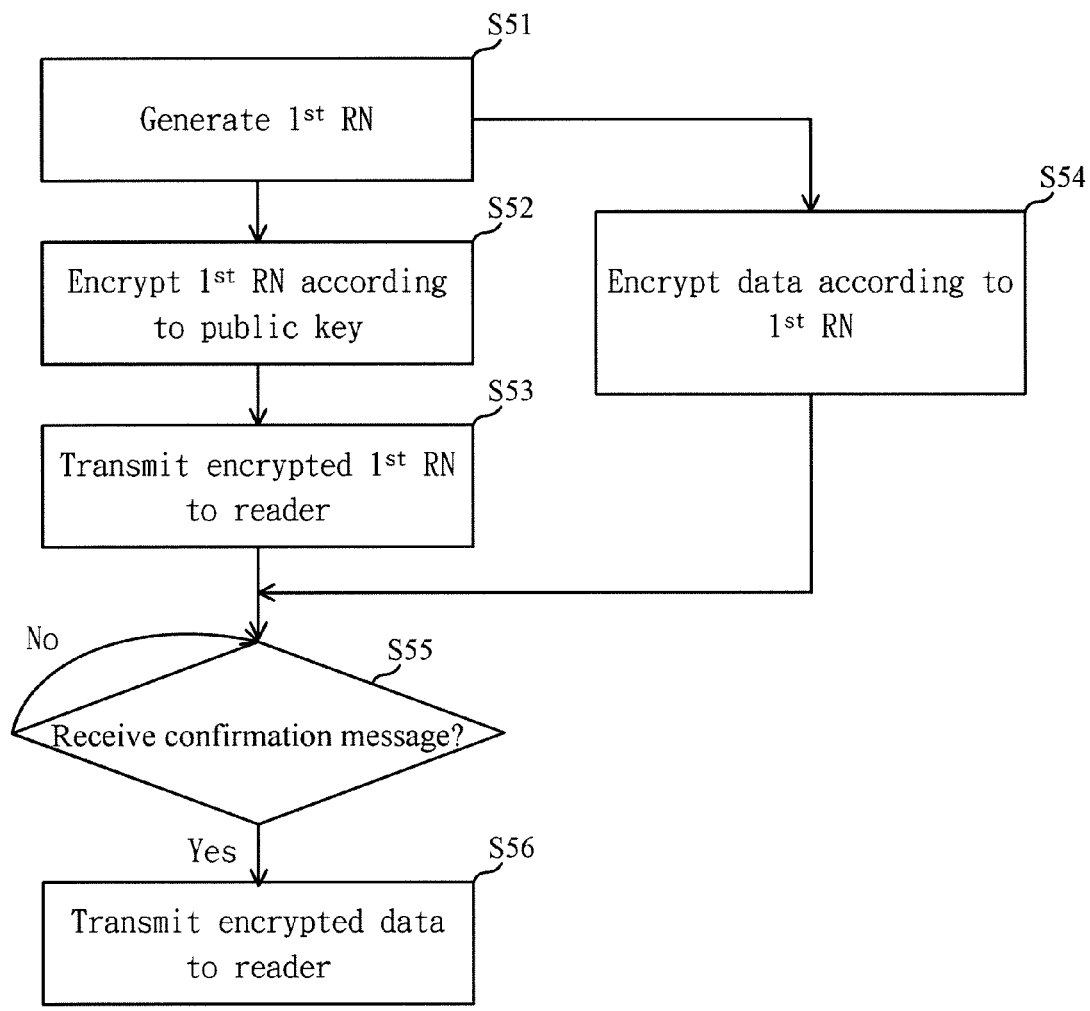
FIG. 5A and FIG. 5B are flowcharts of a data encryption procedure using an RFID tag according to the invention.

To prevent unlawful acquisition and misuse of data that the RFID tag replies to the RFID reader, the RFID tag may encrypt data of the RFID tag before sending it. FIG. 5A shows a flowchart of data encryption using an RFID tag according to the invention.

In Step S51, a first random number is generated. In Step S52, the first random number is encrypted using a public key of a set of asymmetric keys to generate an encrypted first random number. In Step S53, the RFID tag first transmits the encrypted first random number to the RFID reader. Meanwhile, in Step S54, data, e.g., an electronic product code, to be provided to the RFID reader by the RFID tag, is encrypted using the first random number to generate encrypted data. In Step S55, whether a corresponding confirmation message from the RFID reader is received is checked and determined.

If a result from Step S55 is affirmative, the RFID tag shall transmit the encrypted data to the RFID reader, as in Step S56. If the result of Step S55 is negative, the RFID tag shall continue in waiting for a reply from the RFID reader.

According to the abovementioned process flow, the first random number can only be retrieved by decrypting the encrypted first random number at the RFID reader that has known the private key of a set of asymmetric keys. Provided that the first random number is obtained, the RFID reader may respond with a confirmation message to the corresponding RFID tag and then decrypt the encrypted data based on the first random number. Compared to direct data transmission without any encryption, the encryption procedure as described substantially lower the risk of data in the RFID tag from thefts.

To further reinforce data security of an RFID system, the RFID tag and the RFID reader may implement another encryption procedure following Step S56 in FIG. 5B so as to protect data to be subsequently transmitted.

In Step S57, an Nth random number is generated, where N is a positive integer greater than 1. In Step S58, the Nth random number is encrypted using an (N−1)th random number to generate an encrypted Nth random number. More specifically, the second random number is encrypted using the first random number in the preceding Step S51. Similarly, a third random number is encrypted using the second random number. Then, in Step S59, the encrypted Nth random number is transmitted to the RFID reader. Meanwhile, in Step S60, data to be provided by the RFID tag to the RFID reader is encrypted using the Nth random number to generate encrypted data.

In Step S61, whether a message from the RFID reader for confirming the encrypted Nth random number is received is checked and determined. If the result from Step S61 is affirmative, the RFID tag shall transmit the encrypted data generated in Step S60 to the RFID tag, as in Step S62. If the result from Step S61 is negative, the RFID tag continues in waiting for a reply from the RFID reader.

The random numbers used in each data encryption in the above flow are different, and thus only an RFID reader capable of decrypting the various random numbers may correctly decrypt data provided by the RFID tag. Even if an illegal RFID reader may have intercepted the encrypted data, contents of the data are much likely to remain untouched as a result of the encryption procedure. In practice, the RFID reader and the RFID tag may also adopt a digital signature for data protection to reduce the risk that the data may be modified during transmission.

Further, according to the invention, the encryption mechanism in the RFID tag may be voluntarily activated by the RFID tag itself, or may be activated upon request of the RFID reader. For example, the approval request sent from the RFID reader at the beginning may further comprise instruction data for instructing whether an encryption function of the RFID tag ought to be activated. Only when the encryption function is activated, the encryption procedure in FIG. 5A and/or FIG. 5B shall be executed.

Under circumstances that the RFID tag is capable of voluntarily activating the encryption mechanism, the RFID reader does not necessarily know in advance whether the encryption mechanism in the RFID tag is activated. Therefore, a mechanism for verifying whether the encryption mechanism is activated may be established between the RFID tag and the RFID reader.

Figure 6:
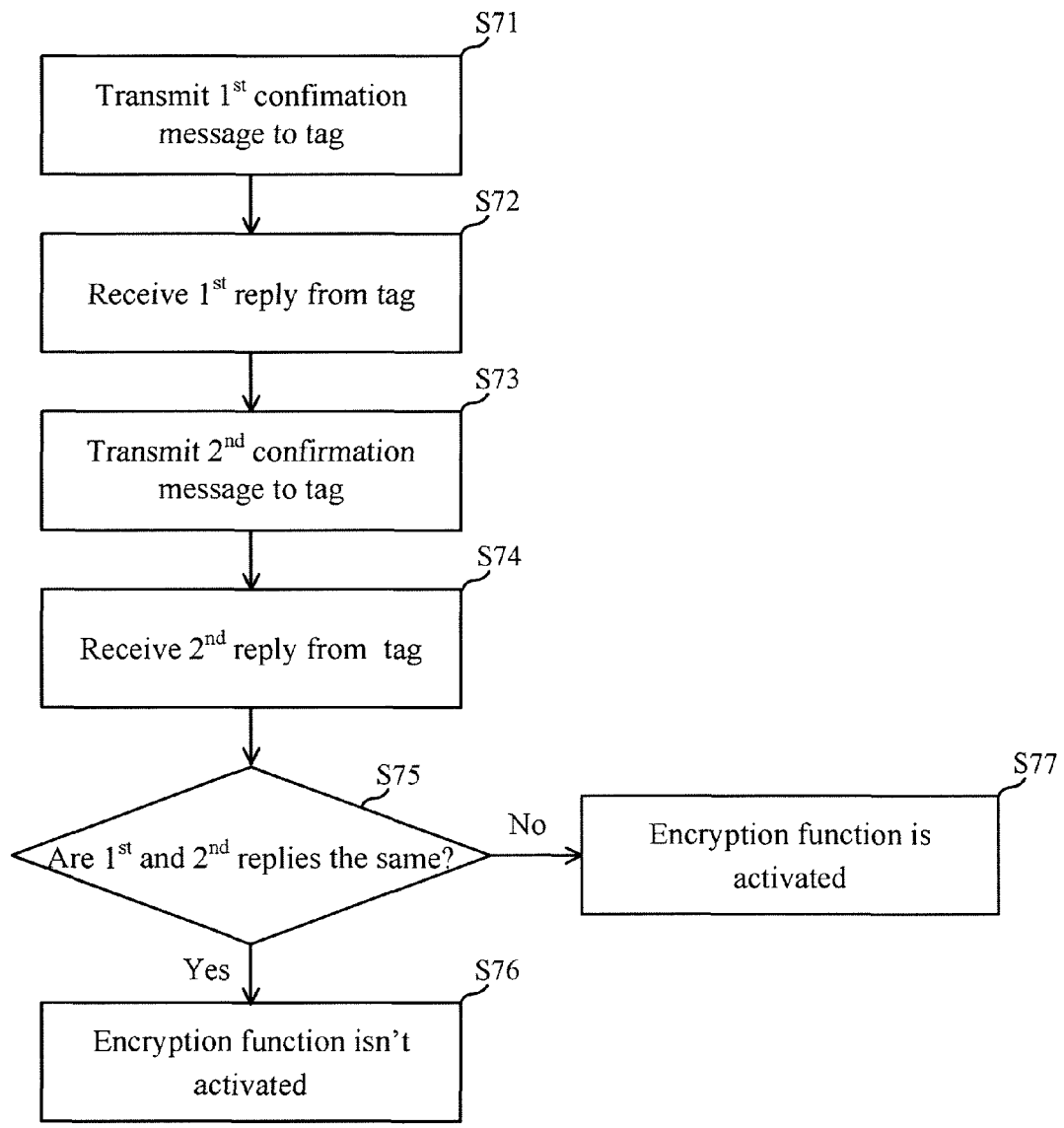
FIG. 6 is a confirmation flowchart for confirming whether an encryption function of an RFID reader is activated according to the invention.

According to one embodiment of the invention, in order to determine whether an encryption function of an RFID tag is activated, an RFID reader may compare whether two or multiple corresponding reply messages are the same by repeatedly transmitting a same confirmation message. FIG. 6 shows a confirmation flowchart of an RFID reader according to the invention.

The RFID reader first performs Step S71 to transmit a first confirmation message to the RFID tag. In Step S72, the RFID reader receives a corresponding first reply from the RFID tag. The RFID reader then performs Step S73 to transmit a second confirmation message to the RFID tag, followed by performing Step S74 to receive a corresponding second reply from the RFID tag. The first confirmation message and the second confirmation message may be the same.

According to the invention, when an encryption function of the RFID tag is not activated, the RFID tag may have the first reply be the same as the second reply to indicate that its encryption function is not activated. In contrast, when the encryption function of the RFID tag is activated or to be activated, the RFID tag may have the second reply be different from the first reply. Therefore, in Step S75, the RFID reader compares whether the first reply and the second reply are the same. If a result from the Step S75 is affirmative, the RFID reader determines that the encryption of the RFID tag is not activated, as in Step S76. If the result from Step S75 is negative, the RFID reader determines that the encryption function of the RFID tag is activated or to be activated, as in Step S77.

Figure 7:
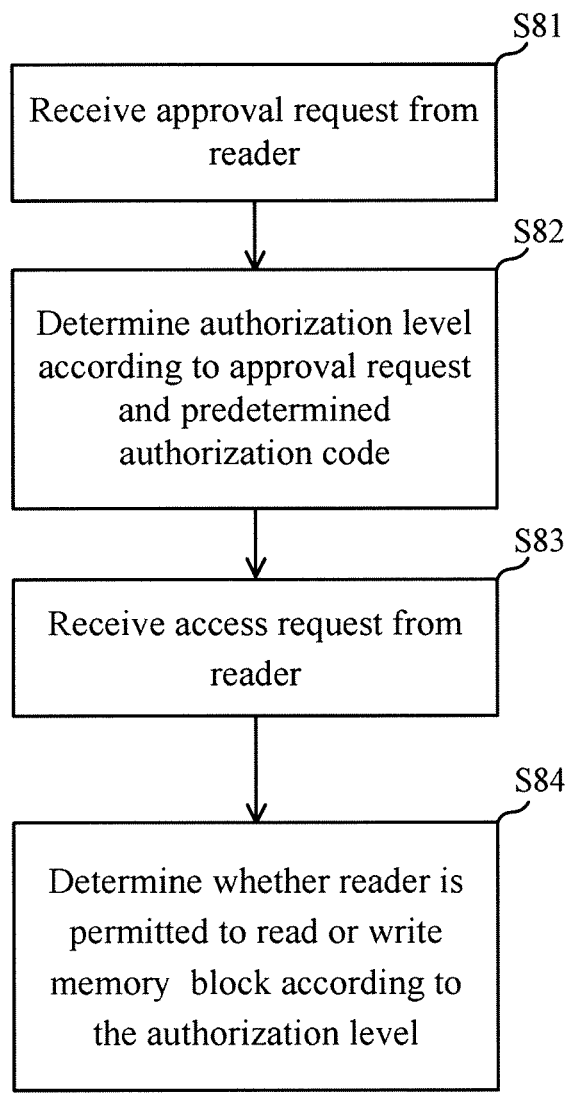
FIG. 7 is a flowchart of an operating method of an RFID tag according to another embodiment of the invention.

FIG. 7 shows a flowchart of an operating method of an RFID tag according to another embodiment of the invention. The RFID tag comprises a memory block stored with at least one predetermined authorization code. The operating method comprises steps described below. In Step S81, the RFID tag receives an approval request form an RFID reader. In Step S82, according to the approval request and the predetermined authorization code, an authorization level of the RFID reader is determined. Next, when the RFID reader sends out an access request, the access request is received in Step S83. In Step S84 of the operating method, it is determined whether the RFID reader is permitted to read or write the memory block according to the authorization level.

Figure 8A:
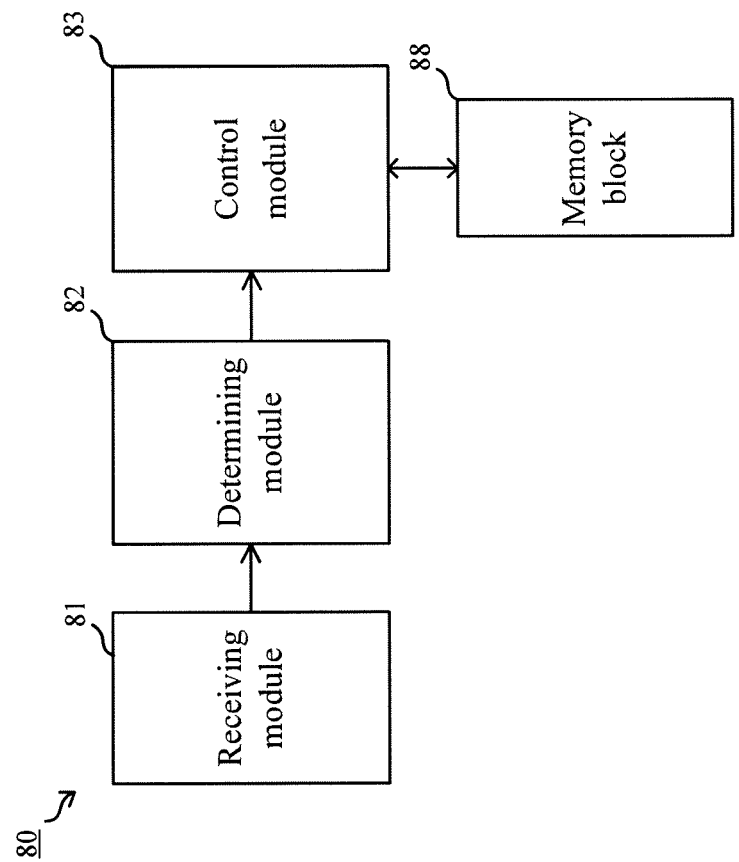
FIG. 8A is a block diagram of an RFID tag according to the invention.

FIG. 8A shows a block diagram of an RFID tag according to the invention. An RFID tag 80 comprises a receiving module 81, a determining module 82, a control module 83 and a memory block 88. The determining module 82 is coupled to the receiving module 81. The control module 83 is coupled to the determining module 82 and the memory block 88. The memory block 88 is stored with at least one predetermined authorization code associated to an RFID reader. In actual practice, the receiving module 81 may be coupled to an antenna for receiving an RF signal from an RFID reader, wherein the RF signal comprises various types of approval requests and access requests. When the receiving module 81 receives an RF signal from a particular RFID reader, the determining module 82 is employed to determine whether the RFID reader is authenticated according to the approval request and the predetermined authorization code. When the RFID reader is not authenticated, the control module 83 does not reply to a subsequent request from the RFID reader.

Figure 8B:
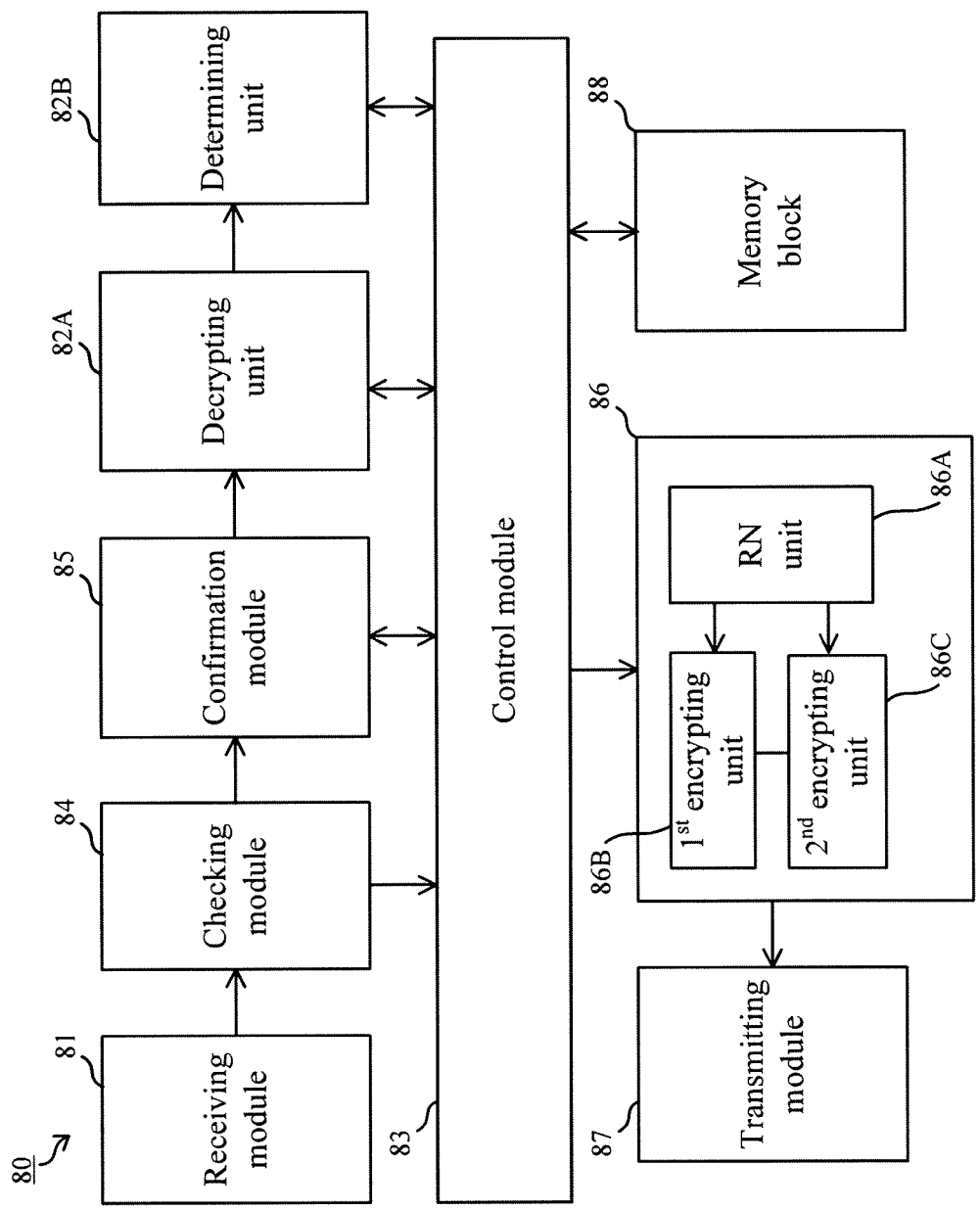
FIG. 8B is a detailed block diagram of an example of the RFID tag.

FIG. 8B shows a detailed block diagram of an example of the RFID tag 80. In this example, the RFID tag 80 further comprises a checking module 84, a confirmation module 85, an encrypting module 86, and a transmitting module 87. The determining module 82 comprises a decrypting unit 82A and a determining unit 82B. The memory block 88 stores all types of data associated with the RFID tag 80, such as an electronic product code of the RFID tag 80 or an authorization management table as shown in FIG. 2A and FIG. 2B.

When the approval request comprises a check code, the checking module 84 determines whether the approval request of the check code is correct, and provides a result to the control module 83. If the result of the approval request by the checking module 84 is negative, the control module 83 commands the confirmation module 85, the decrypting unit 82A and the determining unit 82B not to proceed any further. If the result of the approval request according to the check code is affirmative, the confirmation module 85 then checks whether an authentication function of the RFID tag 80 is activated. When the authentication function of the RFID tag 80 is not activated, the control module 83 may also command the decrypting unit 82A and the determining unit 82B not to proceed any further.

Note that the determining module 82 comprises the decrypting unit 82A and the determining unit 82B. In the event that the approval request comprises an encrypted authorization code, the decrypting unit 82A may decrypt the encrypted authorization code to generate the authorization code. The determining unit 82B may determine whether the RFID reader is authenticated according to the authorization code and the predetermined authorization code. Alternatively, the determining unit 82B may also determine the authorization level of the RFID reader according to the authorization code or the identification code of the RFID reader. When the RFID reader is authenticated, the control module 83 controls how the RFID tag 80 ought to reply to a subsequent request from the RFID reader. Further, the control module 83 may determine whether the RFID reader is permitted to read or write data in the memory block 88 according to the authorization level.

The encrypting module 86 is for performing the encryption procedure shown in FIG. 5A, for example. Referring to FIG. 8B, the encrypting module 86 comprises a random number unit 86A, a first encrypting unit 86B and a second encrypting unit 86C. The random number unit 86A is for generating a first random number. The first encrypting unit 86B is used for encrypting the first random number using a public key to generate an encrypted first random number. The transmitting module 87 then transmits the encrypted first random number to the RFID reader. The second encrypting unit 86C encrypts data of the RFID reader to be transmitted to the RFID tag using the first random number to generate encrypted data. Upon receiving a confirmation message from the RFID reader, the transmitting module shall transmit the encrypted data to the RFID reader.

Figure 5B:
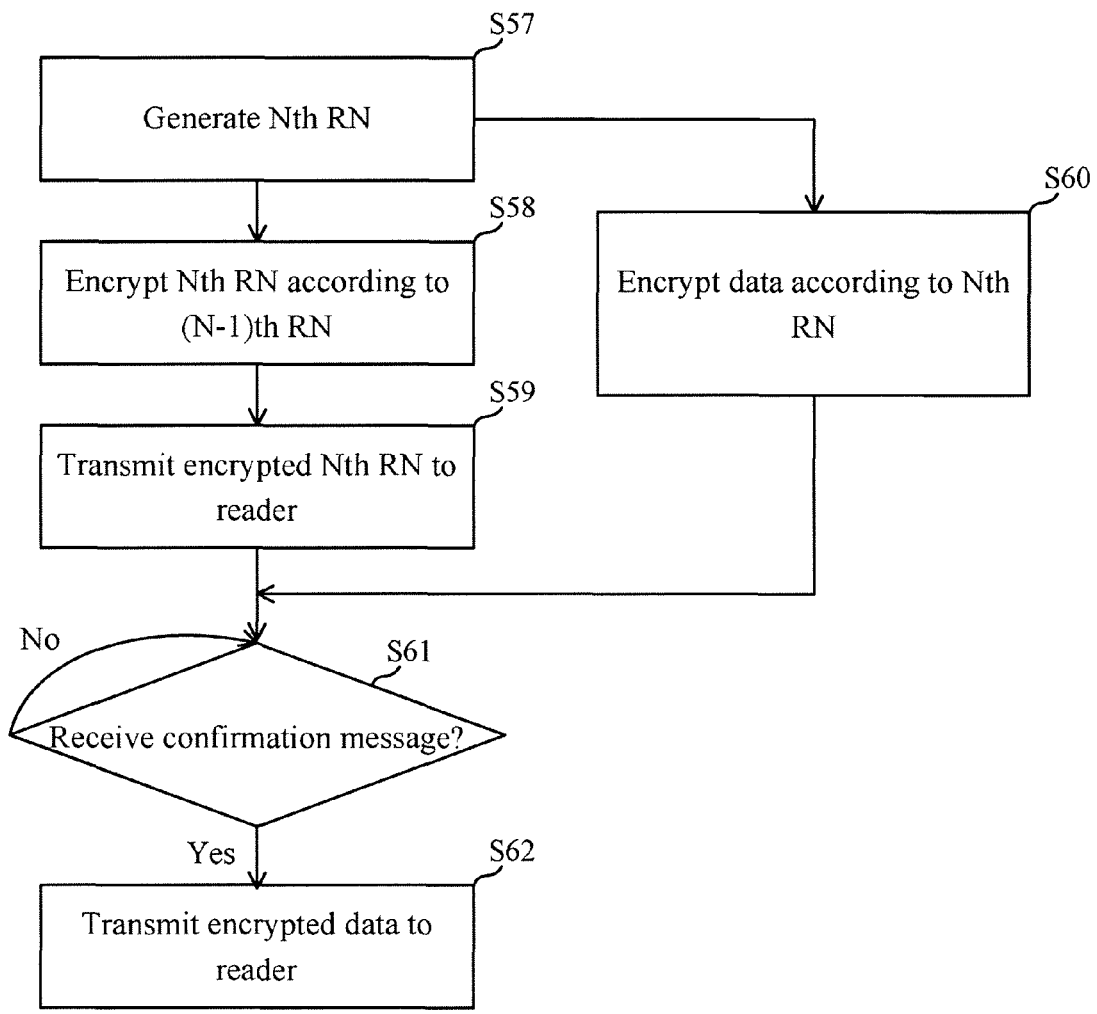

The random number unit 86A may also be used to generate the Nth random number in the encryption procedure shown in FIG. 5B. The first encrypting unit 86B may further be used to encrypt the Nth random number using an (N−1)th random number to generate an encrypted Nth random number. The second encrypting unit 86C may be used to encrypt data of the RFID tag 80 using the Nth random number to generate encrypted data.

To correspond to the confirmation flowchart in FIG. 6, the control module 83 may transmit different or same reply messages by controlling the transmitting module 87 to indicate that an encryption function of the RFID tag 80 is activated. In practice, the transmitting module 87 and the receiving module 81 may be coupled to a same antenna.

It is apparent from the above embodiments that, the RFID tag and the operating method thereof according to the present invention effectively reduce the risk that the RFID tag may be unlawfully acquired by unauthorized RFID readers using the authentication procedure and encryption mechanism disclosed, thereby increasing data security compared to the prior art.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An operating method of a radio frequency identification (RFID) tag having a memory block that stores a predetermined authorization code and a predetermined identification code associated with an RFID reader, the method comprising steps of:
   a1) receiving an approval request with an identification code of the RFID reader from the RFID reader;
   a2) determining the predetermined authorization code according to the predetermined identification code and the identification code;
   b) determining by the RFID tag whether the RFID reader is authenticated according to the approval request and the predetermined authorization code; and
   c) responding to a subsequent request transmitted from the RFID reader when the RFID reader is authenticated by the RFID tag,
   wherein the memory block further stores different minimum authorization level information, respectively for each of reading and writing privileges, associated with respective memory sub-blocks, and wherein the memory sub-blocks have different sizes, the RFID tag determines a predetermined authorization level of the RFID reader according to the predetermined identification code and the identification code, and the method further comprises a step of:
   (d) determining a reply method in response to a subsequent request according to the predetermined authorization level and the minimum authorization level information when the RFID reader is authenticated by the RFID tag.

2. The method as claimed in claim 1, wherein the approval request comprises an encrypted authorization code from encrypting an authorization code at the RFID reader, and the step (b) comprises steps of:
   b1) decrypting the encrypted authorization code to generate the authorization code; and
   b2) determining whether the RFID reader is authenticated by the RFID tag according to the decrypted authorization code and the predetermined authorization code.

3. The method as claimed in claim 2, wherein the authorization code is encrypted into the encrypted authorization code using a private key, the encrypted authorization code is decrypted into the authorization code using a public key, and the public key and the private key form a set of asymmetric keys.

4. The method as claimed in claim 1, further comprising a step of:
   after the step (a), determining whether data of the approval request is correct according to a check code contained in the approval request;
   wherein, the steps (b) and (c) are performed when a result of checking the check code is correct.

5. The method as claimed in claim 1, further comprising a step of:
   after the step (a), determining whether an authentication function of the RFID tag is activated;
   wherein, the steps (b) and (c) are performed when the authentication function is activated.

6. The method as claimed in claim 1, further comprising steps of:
   e1) generating a first random number;
   e2) encrypting the first random number using a public key to generate an encrypted first random number;
   e3) transmitting the encrypted first random number to the RFID reader;
   e4) encrypting an electronic product code of the RFID tag using the first random number to generate an encrypted electronic product code; and
   e5) transmitting the encrypted electronic product code to the RFID reader upon receiving a confirmation message from the RFID reader.

7. The method as claimed in claim 6, further comprising steps of:
   generating an Nth random number, N being a positive integer greater than 1;
   encrypting the Nth random number using an (N-1)th random number to generate an encrypted Nth random number;
   transmitting the encrypted Nth random number to the RFID reader;
   encrypting data of the RFID tag using the Nth random number to generate encrypted data; and
   transmitting the encrypted data to the RFID reader.

8. The method as claimed in claim 6, wherein the approval request further comprises instruction data for instructing whether to activate an encryption function of the RFID tag, and the steps (e1) to (e5) are performed when the encryption function is activated.

9. The method as claimed in claim 1, further comprising steps of:
   transmitting a first reply to the RFID reader in response to a first confirmation message from the RFID reader; and
   transmitting a second reply to the RFID reader in response to a second confirmation message from the RFID reader;
   wherein, the first reply is different from the second reply when an encryption function of the RFID tag is activated.

10. A radio frequency identification (RFID) tag implemented with a chip circuit, comprising:
    a memory block in the chip circuit having stored therein a predetermined authorization code and a predetermined identification code associated with an RFID reader;
    a receiving module in the chip circuit configured to receive an approval request with an identification code of the RFID reader from the RFID reader and to determine the predetermined authorization code according to the predetermined identification code and the identification code;
    a determining module in the chip circuit, coupled to the receiving module, configured to determine whether the RFID reader is authenticated according to the approval request and the predetermined authorization code; and
    a control module in the chip circuit, coupled to the determining module and the memory block configured to respond to a subsequent request from the RFID reader when the RFID reader is authenticated,
    wherein the determining module comprises a determining unit, for determining whether the RFID reader is authenticated according to the approval request and the predetermined authorization code, and
    wherein the memory block further stores different minimum authorization level information, respectively for each of reading and writing privileges, associated with respective memory sub-blocks, and wherein the memory sub-blocks have different sizes, the determining module determines a predetermined authorization level for the RFID reader according to the predetermined identification code and the identification code, and the control module determines a reply method to a subsequent request according to the predetermined authorization level and the minimum authorization level information when the RFID reader is authenticated.

11. The RFID tag as claimed in claim 10, wherein:
the approval request comprises an encrypted authorization code from encrypting an authorization code at the RFID reader; and
the determining module comprises a decrypting unit for decrypting the encrypted authorization code to generate the authorization code; and a determining unit for determining whether the RFID reader is authenticated according to the authorization code and the predetermined authorization code.

12. The RFID tag as claimed in claim 11, wherein the authorization code is encrypted into the encrypted authorization code using a private key, the encrypted authorization code is decrypted into the authorization code using a public key, and the public key and the private key form a set of asymmetric keys.

13. The RFID tag as claimed in claim 10, further comprising:
a checking module, for determining whether data of the approval request is correct according to a check code contained in the approval request.

14. The RFID tag as claimed in claim 10, further comprising:
a confirmation module, for confirming whether an authentication function is activated;
wherein, the control module controls the determining module according to a confirmation result of the confirmation module.

15. The RFID tag as claimed in claim 10, further comprising:
a transmitting module; and
an encrypting module, comprising:
a random number unit, for generating a first random number;
a first encrypting unit, for encrypting the first random number using a public key to generate an encrypted first random number to be transmitted to the RFID reader by the transmitting module; and
a second encrypting unit, for encrypting an electronic product code of the RFID tag using the first random number to generate an encrypted electronic product code;
wherein, the transmitting unit transmits the encrypted electronic product code to the RFID reader upon receiving a confirmation message from the RFID reader.

16. The RFID tag as claimed in claim 15, wherein the random number unit further generates an Nth random number, with N being a positive integer greater than 1; the first encrypting unit further encrypts the Nth random number using an (N−1)th random number to generate an encrypted Nth random number; the second encrypting unit further encrypts data of the RFID tag using the Nth random number to generate encrypted data; and the transmitting unit further transmits the encrypted Nth random number and the encrypted data to the RFID reader.

17. The RFID tag as claimed in claim 15, wherein the approval request further comprises instruction data for instructing whether to activate an encryption function of the RFID tag, and the encrypting module operates when the encryption function is activated.

18. The RFID tag as claimed in claim 10, further comprising:
a transmitting module, controlled by the control module to transmit a first reply to the RFID reader in response to a first confirmation message from the RFID reader, and controlled by the control module to transmit a second reply to the RFID reader in response to a second confirmation message from the RFID reader;
wherein, the first reply is different from the second reply when an encryption function of the RFID tag is activated.

19. An operating method of a radio frequency identification (RFID) tag, the RFID tag comprising a memory block that stores a predetermined authorization code and a predetermined identification code, the method comprising steps of:
a) receiving an approval request with an identification code of the RFID reader from an RFID reader and determining the predetermined authorization code according to the predetermined identification code and the identification code;
b) determining an authorization level of the RFID reader according to the approval request and the predetermined authorization code;
c) receiving an access request from the RFID reader; and
d) determining whether the RFID reader is permitted to access a given memory sub-block within the memory block according to the authorization level and different minimum authorization level information, respectively for each of reading and writing privileges, associated with respective memory sub-blocks, and wherein the memory sub-blocks have different sizes.

20. The method as claimed in claim 19, wherein the method further comprising a step of:
e) determining whether the RFID reader is authenticated according to the predetermined authorization code and the authorization code;
wherein, the step (b) is performed when the RFID reader is authenticated by the RFID tag.

21. The method as claimed in claim 20, wherein the authorization code is encrypted into an encrypted authorization code using a private key, the memory block stores a public key, and the method further comprises steps of:
f) determining the public key corresponding to the private key according to the identification code and the predetermined identification code; and
g) decrypting the encrypted authorization code using the public key;
wherein, the public key and the private key form a set of asymmetric keys.

22. A radio frequency identification (RFID) tag implemented with a chip circuit, comprising:
a memory block in the chip circuit having stored therein a predetermined authorization code and a predetermined identification code;
a receiving module in the chip circuit configured to receive an approval request with an identification code of the RFID reader from an RFID reader;
a determining module in the chip circuit configured to determine the predetermined authorization code according to the predetermined identification code and the identification code and to determine an authorization level of the RFID reader according to the approval request and the predetermined authorization code; and
a control module in the chip module configured to determine whether the RFID reader is permitted to access a given memory sub-block within the memory block according to the authorization level and different minimum authorization level information, respectively for each of reading and writing privileges, associated with respective memory sub-blocks, and wherein the memory sub-blocks have different sizes.

23. The RFID tag as claimed in claim 22, wherein the determining module further determines whether the RFID reader is authenticated according to the predetermined authorization code and the authorization code, and the determining module determines the authorization level of the RFID reader when the RFID reader is authenticated.

24. The RFID tag as claimed in claim 23, wherein the authorization code is encrypted into an encrypted authorization code using a private key, and the memory block is further stored with a public key, the tag further comprising:
  a decrypting module, for determining the public key corresponding to the private key according to the identification code and the predetermined identification code, and decrypting the encrypted authorization code using the public key;
  wherein, the public key and the private key form a set of asymmetric keys.

* * * * *